US012749620B2

(12) United States Patent
Cheng et al.

(10) Patent No.: US 12,749,620 B2
(45) Date of Patent: Sep. 29, 2026

(54) PERMEATING TREATMENT METHOD FOR RADIALLY ORIENTED SINTERED MAGNET, MAGNET, AND COMPOSITION FOR MAGNET PERMEATION

(71) Applicant: Shenzhen Radimag Magnets Co., Ltd, Shenzhen (CN)

(72) Inventors: Wenhao Cheng, Shenzhen (CN); Fangyun Wei, Shenzhen (CN); Yan Wang, Shenzhen (CN); Zoucheng Cheng, Shenzhen (CN)

(73) Assignee: China Rare Earth Radimag (Shenzhen) Technology Co., Ltd., Shenzhen (CN)

( * ) Notice: Subject to any disclaimer, the term of this patent is extended or adjusted under 35 U.S.C. 154(b) by 146 days.

(21) Appl. No.: 18/501,659

(22) Filed: Nov. 3, 2023

(65) Prior Publication Data

US 2024/0071683 A1 Feb. 29, 2024

Related U.S. Application Data

(62) Division of application No. 16/401,655, filed on May 2, 2019, now abandoned.

(30) Foreign Application Priority Data

Jun. 8, 2018 (CN) ......................... 201810587843.4
Jun. 8, 2018 (CN) ......................... 201810589062.9
Jun. 8, 2018 (CN) ......................... 201810589072.2
Jun. 8, 2018 (CN) ......................... 201810589832.X

(51) Int. Cl.
*H01F 41/02* (2006.01)
*C04B 41/50* (2006.01)
*H01F 1/053* (2006.01)
*H01F 1/057* (2006.01)

(52) U.S. Cl.
CPC ..... *H01F 41/0293* (2013.01); *C04B 41/5029* (2013.01); *C04B 41/5031* (2013.01); *C04B 41/5041* (2013.01); *C04B 41/5045* (2013.01); *C04B 41/5051* (2013.01); *H01F 1/0536* (2013.01); *H01F 41/0266* (2013.01); *H01F 1/0577* (2013.01)

(58) Field of Classification Search
CPC .. H01F 41/0293; H01F 1/0536; H01F 1/0577; C04B 41/5029; C04B 41/5031; C04B 41/5041; C04B 41/5045; C04B 41/5051
See application file for complete search history.

(56) References Cited

U.S. PATENT DOCUMENTS

2014/0375404 A1* 12/2014 Kuniyoshi ............ H01F 1/0536 427/127
2015/0235747 A1* 8/2015 Miyamoto .............. C22C 28/00 419/27
2017/0221616 A1* 8/2017 Iwasaki ............... H01F 41/0293
2018/0108464 A1* 4/2018 Fujikawa .............. C22C 38/005
2018/0282225 A1* 10/2018 Takai .................... C04B 35/486
2020/0082962 A1* 3/2020 Ohashi .................. C22C 38/005

FOREIGN PATENT DOCUMENTS

JP 2012169436 A * 9/2012

* cited by examiner

*Primary Examiner* — Jonathan Johnson

(57) ABSTRACT

The present invention provides a permeating treatment method for radially oriented sintered magnet, a magnet, and a composition for magnet permeation, wherein in permeating treatment, the magnet and a target permeation source maintain relative movement therebetween all the time, thus internal defects of the oriented sintered magnet are overcome, and the coercivity and thermal stability of the sintered oriented magnet can be stably improved. Moreover, the present invention, having a controllable permeation amount and uniform permeation, is suitable for permeation reaction of a target permeation source with high viscosity or a low melting point, has a wide range of choice for raw materials, and high utilization ratio of permeation elements substantially with no loss, and low cost, thus being suitable for industrialized popularization and use.

13 Claims, No Drawings

PERMEATING TREATMENT METHOD FOR RADIALLY ORIENTED SINTERED MAGNET, MAGNET, AND COMPOSITION FOR MAGNET PERMEATION

CROSS-REFERENCE TO RELATED APPLICATIONS

This application is a divisional application of U.S. patent application Ser. No. 16/401,655, filed May 2, 2019. This application claims priorities to the U.S. patent application Ser. No. 16/401,655, filed May 2, 2019, and to the following four Chinese patent applications, the contents of which should be considered as being incorporated in the present application in their entirety. The four Chinese patent applications are as follows:

(1) CN201810589072.2, filed on Jun. 8, 2018, entitled "Treatment Method for Radially Oriented Sintered Ring Magnet";

(2) CN201810587843.4, filed on Jun. 8, 2018, entitled "Method for Improving Magnetic Property of Sintered Magnet and Magnet Prepared";

(3) CN201810589062.9, filed on Jun. 8, 2018, entitled "Method for Repairing Internal Defects of Sintered Oriented Magnet and Repaired Magnet";

(4) CN201810589832.X, filed on Jun. 8, 2018, entitled "Composition, Use, and Method for Permeating treatment of Sintered Oriented Magnet".

TECHNICAL FIELD

This invention is in the field of magnetic materials.

BACKGROUND

The third generation rare-earth NdFeB permanent magnetic material has been widely used in many fields due to high saturation magnetization, high coercivity, high magnetic energy product (BH)max, good mechanical processing properties, and a relatively low cost, but low thermal stability is a main defect restricting further development and application of sintered NdFeB.

Researches reveal that highly oriented degree and uniformly fine grains, continuous uniform distribution of relatively fine and rare-earth rich grain boundary phase, and smooth phase interface without defects, etc. are key factors for preparing a sintered NdFeB magnet with high performance. Currently, a manner of evaporation or film coating, and then heating treatment is generally used to permeate heavy rare-earth elements into a magnet, so as to improve the magnetic properties of a sintered NdFeB magnet, but these methods have quite low utilization rate of permeation elements, and high loss of permeation raw materials, and are unable to be recycled, resulting in high processing cost, failing to satisfy the industrialization of large-scale production, and having limited permeation depth, being hard to control penetration and unstable effects on the improvement of the magnetic performance and heat resistance.

The conventional methods for improving coercivity of a sintered magnet include: mixing a rare-earth fluoride and a solvent, then coating the mixture on a surface of a NdFeB magnet, or forming a rare-earth-metal film/layer on the surface of the magnet using a method of evaporation, sputtering, and then performing vacuum heat-treatment, for example, in CN201110161359.3, so as to further improve the coercivity of the sintered NdFeB magnet. For all of these methods, however, a covering layer is first formed on a surface of a substrate of the sintered NdFeB magnet, and then rare-earth elements permeate into the substrate of the sintered NdFeB magnet through heat-treatment, thus generally presenting problems of a low utilization ratio of the permeation elements, high loss, nonuniform permeation, an uncontrolled permeation amount, and unstable effect on the improvement of the magnetic properties of the sintered magnet.

Besides, currently in a process of manufacturing a radially oriented magnet, from alloy smelting, preparing powder, magnetic field molding, vacuum sintering, heat-treatment to mechanical processing, each production step causes more or less defects to the inside microstructure of the magnet, such that that the radially oriented magnet is decreased in properties, unstable in quality, and relatively low in yield rate, therefore, improving the properties of the sintered oriented magnet is always a problem in the industry.

SUMMARY

In order to solve the above technical problems, a first technical solution of the present invention provides a permeating treatment method capable of stably improving magnetic performance of a sintered magnet, and repairing internal defects of a sintered oriented magnet. In a permeation process, apart from atomic diffusion and migration movement of target permeation source elements with respect to the magnet, a target permeation source and the magnet are not relatively fixed in macro position, but they have macro relative movement which excludes ball-milling movement.

All methods for permeation of a certain element into a magnet (including a ring magnet, an arc magnet, a sheet magnet, etc.) with the help of atomic diffusion are based on the mechanism of solid phase reaction, that is, under a high temperature condition, when solids containing elements with different concentrations are in contact, the elements will diffuse from the solid with a high concentration to the solid with a low concentration, that is, atomic migration and diffusion movement take place, which is also the mechanism of permeation or diffusion reaction.

Particularly, the relative macro movement in the present invention is rotation or stirring movement, at a rotational velocity of 0.01 rpm-6000 rpm, preferably 0.5-1000 rpm, and more preferably 0.5-100 rpm.

In the present invention, the internal defects of the oriented sintered magnet are repaired through heated permeation. Since there are many defects inside the oriented sintered magnet, including point defect, line defect, face defect and bulk defect etc., the elements permeating into the magnet may be subjected to secondary chemical reaction more or less, then some defects may be repaired, and some defects may disappear, resulting in improvement on main phase grain interface, re-distribution of grain boundary phase, and adjustment in grain boundary phase composition and structure.

A system of heating preservation in sections is used in the heated permeation: gently heating a ring magnet at a heating rate of 3-8° C./min to 500-800° C. and maintaining the temperature at 500-800° C. for 1-20 h in a first section, then gently heating the ring magnet at a heating rate of 0.5-2° C./min to 800-1050° C. and keeping the temperature at 800-1050° C. for 3-40 h in a second section, afterwards rapidly cooling or naturally cooling the ring magnet to 40-100° C., wherein in the cooling the ring magnet still maintains the macro relative movement with respect to the target permeation source, and wherein the heating rate in a second section is lower than the heating rate in a first section, and a total permeation time is controlled within 50 h.

The target permeation source includes 20-99.99 wt % of a permeation additive and 0.01-80 wt % of a monomer or a compound composed of elements that are permeable into 2:14:1 type main phase, grain boundary phase, and/or grain boundary corner phase of the ring magnet. The elements that are permeable into the 2:14:1 type main phase of the ring magnet include any one or more elements selected from the group consisting of La, Ce, Pr, Nd, Pm, Sm, Eu, Gd, Tb, Dy, Ho, Er, Tm, Yb, Lu, Y, and Sc, and any one or more elements selected from the group consisting of Fe, Co, Ni, and B; the elements that are permeable into the grain boundary phase and/or the grain boundary corner phase include any one or more selected from the group consisting of Ga, Nb, Cu, Al, Zr, Ti, O, F, and N; the compound includes oxides, fluorides, carbides, nitrides, hydrides, alloys and solid solutions of the above elements; the permeation additive is an auxiliary agent for improving fluidity of the target permeation source and/or a carrier of a permeable substance, including any one or more selected from the group consisting of aluminum oxide, magnesium oxide, zirconium oxide and titanium oxide.

Preferably, the target permeation source includes 30-99.99 wt % of a permeation additive and 0.1-70 wt % of a monomer or a compound composed of elements that are permeable into 2:14:1 type main phase, grain boundary phase, and/or grain boundary corner phase of the ring magnet; preferably, the target permeation source includes 35-99.99 wt % of a permeation additive and 0.1-65 wt % of a monomer and/or a compound composed of elements that are permeable into main phase, grain boundary phase, and/or grain boundary corner phase of the R—Fe—B magnet.

Further, the target permeation source contains a monomer and/or a compound having a melting point of lower than 400° C., and preferably, the target permeation source contains 0.1-5 wt % of metal Ga having a melting point of 29.8° C.

Specifically, the above target permeation source includes: 35-96.4 wt % of any one or more selected from the group consisting of zirconium oxide, magnesium oxide, aluminum oxide and titanium oxide, 0.1-5 wt % of metal gallium, 2-30% of terbium fluoride, 1-5% of dysprosium fluoride, and 0.5-25 wt % of zirconium powder and/or niobium powder;

Alternatively, the target permeation source includes: 55-94.4 wt % of any one or more selected from the group consisting of zirconium oxide, magnesium oxide, aluminum oxide and titanium oxide, 0.1-5 wt % of metal gallium, 5-35% of terbium fluoride, and 0.5-5 wt % of carbonyl cobalt powder;

Alternatively, the target permeation source includes 55-99.9 wt % of any one or more selected from the group consisting of zirconium oxide, magnesium oxide, aluminum oxide or titanium oxide, 0.1-5 wt % of metal gallium, 0-35% of terbium fluoride, 0-2 wt % carbonyl cobalt powder, and 0-3 wt % of niobium powder or zirconium powder;

Alternatively, the target permeation source includes 30-98.5 wt % of any one or more selected from the group consisting of zirconium oxide, magnesium oxide, aluminum oxide or titanium oxide, 0.1-5 wt % of metal gallium, 0.2-25% of terbium fluoride, 0.5-20% of dysprosium fluoride, 0.2-10 wt % of carbonyl cobalt powder, and 0.5-10 wt % of niobium powder, zirconium powder or titanium powder.

The radially oriented sintered ring magnet has an easy magnetization direction that is arranged according to a radial direction and has any number of poles.

The radially oriented sintered ring magnet also may be replaced by a parallelly oriented sintered ring magnet; the ring magnet also may be replaced by an arc magnet or a sheet magnet.

The ring magnet has 2:14:1 type main phase, and composition thereof is represented by a following general formula: $R_aT_bM_cB_dX_e$:

where R is at least one element selected from rare-earth elements including Y and Sc, T is either or both of Fe and Co;

M is at least one element selected from the group consisting of Al, Ti, Ni, Cu, Ga, Zr, and Nb;

B is boron, and X is at least one element selected from the group consisting of O, F, N, and C;

a, b, c, d, and e represent weight percentages, $28 \leq a \leq 36$, $0.05 \leq c \leq 8.0$, $0.9 \leq d \leq 11.3$, $e \leq 0.5$, a balance of b.

A second technical solution of the present invention provides a treatment method for oriented sintered magnet, including the following steps in turn:

A. pre-treatment: removing pollutants, rust, and an oxide layer from a surface of the magnet;

B. preparing a target permeation source;

C. permeation treatment during moving;

D. after the permeating treatment is finished, taking out the magnet and subjecting the magnet to tempering treatment; and E. obtaining a product after the tempering treatment.

An easy magnetization direction of the magnet is radially oriented from a center, and the magnet preferably is a ring magnet.

In step B, the target permeation source includes 30-99.99 wt % of a permeation additive and 0.1-70 wt % of a monomer and/or a compound composed of elements that are permeable into 2:14:1 type main phase, grain boundary phase, and/or grain boundary corner phase of the ring magnet. The elements that are permeable into the 2:14:1 type main phase of the ring magnet include any one or more elements selected from the group consisting of La, Ce, Pr, Nd, Pm, Sm, Eu, Gd, Tb, Dy, Ho, Er, Tm, Yb, Lu, Y, and Sc, and any one or more elements selected from the group consisting of Fe, Co, Ni, and B; the elements that are permeable into the grain boundary phase and/or the grain boundary corner phase include any one or more selected from the group consisting of Ga, Nb, Cu, Al, Zr, Ti, O, F, and N; the compound includes oxides, fluorides, carbides, nitrides, hydrides, alloys, and solid solutions of the above elements; the permeation additive is an auxiliary agent for improving fluidity of the target permeation source and/or a carrier of a permeable substance, including any one or more selected from the group consisting of aluminum oxide, magnesium oxide, zirconium oxide, and titanium oxide.

Preferably, in step B, firstly high-temperature baking at a temperature of above 1050° C. is performed for any one or more selected from the group consisting of powder zirconium oxide, magnesium oxide, aluminum oxide, or titanium oxide, then a monomer or a compound having a melting point below 400° C. is added to the baked powder to form a pre-mixture, and finally, other raw materials having baked at a temperature of above 100° C. are added to the pre-mixture.

In the step C, the magnet having undergone the surface pre-treatment in step A and the target permeation source prepared in step B are disposed into a container in batches according to a volume ratio of 1:1-1:100, to be subjected to the permeating treatment. In a permeation process, the magnet and the target permeation source have relative movement therebetween all the time. The relative movement refers to macro movement apart from the atomic migration movement of elements composed of the target permeation source with respect to the magnet, but excludes ball-milling movement; a vacuum or inert-gas atmosphere is maintained in the movement permeation;

In the step C, a system of heating at variable rate and multi-section permeation and heat preservation is used, which effectively avoids problems such as cracking and deformation of the magnet due to non-uniform heating, and improves a yield rate of large-scale treatment of the magnet in industry, wherein the ring magnet is gently heated at a heating rate of 3-8° C./min to 500-800° C. and the temperature is kept at 500-800° C. for 1-10 h in a first section, then the ring magnet is gently heated at a heating rate of 0.5-3° C./min to 800-950° C. and the temperature is kept at 800-950° C. for 3-20 h in a second section, afterwards the ring magnet is rapidly cooled or naturally cooled to 40-100° C., wherein in the cooling the ring magnet still maintains the relative movement with respect to the target permeation source, and wherein the heating rate in a second section is lower than the heating rate in a first section, and a total permeation time is controlled within 30 h, preferably within 20 h.

In the step D, the tempering is carried out at a temperature of 400-600° C. for 2-20 h.

Prior of the step A, a step of performing rough processing on an inner surface and an outer surface of the oriented magnet is further included.

A method for preparing the radially oriented sintered magnet includes a step of performing radially oriented molding using a rotational magnetic field, including: (1) filling a mold cavity with magnetic powder to be molded, providing an inner magnetic pole inside the mold cavity, and providing an outer magnetic pole outside the mold cavity; (2) rotating the outer magnetic pole relative to the mold cavity, or rotating the mold cavity relative to the outer magnetic pole, wherein an oriented magnetic field is generated between the inner magnetic pole and the outer magnetic pole, and the oriented magnetic field and the magnetic powder have relative rotation therebetween for magnetization and radial orientation of the magnetic powder; (3) while rotating, applying a gradually increased pressure to compress and mold the magnetic powder, to obtain a blank of the radially oriented magnet, which blank is subjected to vacuum sintering at 1000-1100° C. to obtain the magnet before treatment.

Alternatively, the step of performing the oriented molding using a rotational magnetic field includes: (1) filling a mold cavity with magnetic powder to be molded, providing a magnetic core inside the mold cavity, and providing a plurality of outer magnetic poles symmetrically outside the mold cavity; (2) rotating the plurality of outer magnetic poles simultaneously with respect to the mold cavity, or rotating the mold cavity with respect to the outer magnetic poles, wherein a plurality of oriented magnetic fields are generated between the magnetic core and the plurality of outer magnetic poles, and the oriented magnetic fields and the magnetic powder have relative rotation therebetween for magnetization and radial orientation of the magnetic powder; (3) while rotating, applying a gradually increased pressure to compress and mold the magnetic powder, to obtain a blank of the radially oriented magnet, which blank is subjected to vacuum sintering at 1000-1100° C. to obtain the magnet before treatment.

The magnetic fields are constant magnetic fields, magnetic fields with regular variations, or magnetic fields with irregular variations.

A third technical solution of the present invention provides a magnet after being treated with the preceding method, including more than 90% in volume of 2:14:1 main phase, 0.1-10% in volume of a compound or a solid solution formed by any one or more selected from the group consisting of Ga, Nb, Cu, Al, Zr, Ti, O, C, F, and N after entering grain boundary phase or grain boundary corner, wherein contents of elements such as O, C, F, and N in the grain boundary phase are higher than contents thereof in the main phase, contents of Ga, Nb, Cu, Al, Zr, and Ti in the grain boundary phase are higher than contents thereof in the main phase, and contents of rare-earth Nd, Pr, Tb, and Dy in the main phase are higher than contents thereof in the grain boundary phase or the grain boundary corner.

Preferably, the magnet includes 95% in volume of 2:14:1 main phase, and 0.1-5% in volume of a compound, a solid solution formed by any one or more elements selected from the group consisting of Ga, Nb, Cu, Al, Zr, Ti, O, C, F, and N after the elements entering grain boundary phase or grain boundary corner.

A fourth technical solution of the present invention provides a composition for permeation of oriented sintered magnet. The composition, used as a target permeation source, includes 20-99.99 wt % of a permeation additive and 0.01-80 wt % of a monomer or a compound composed of elements that are permeable into 2:14:1 type main phase, grain boundary phase, and/or grain boundary corner phase of the ring magnet; the permeation additive is any one or more selected from the group consisting of aluminum oxide, magnesium oxide, zirconium oxide, and titanium oxide. The elements that are permeable into the 2:14:1 type main phase of the ring magnet include any one or more elements selected from the group consisting of La, Ce, Pr, Nd, Pm, Sm, Eu, Gd, Tb, Dy, Ho, Er, Tm, Yb, Lu, Y, and Sc, and any one or more elements selected from the group consisting of Fe, Co, Ni, and B; the elements that are permeable into the grain boundary phase and/or the grain boundary corner phase include any one or more selected from the group consisting of Ga, Nb, Cu, Al, Zr, Ti, O, F, and N; the compound includes oxides, fluorides, carbides, nitrides, hydrides, alloys and solid solutions of the above elements; the permeation additive is an auxiliary agent for improving fluidity of the target permeation source and/or a carrier of a permeable substance.

Further, the target permeation source contains a monomer and/or a compound having a melting point of lower than 400° C., and preferably, the target permeation source contains 0.1-5 wt % of metal Ga having a melting point of 29.8° C.

Preferably, the target permeation source includes 30-99.99 wt % of a permeation additive and 0.1-70 wt % of a monomer or a compound composed of elements that are permeable into 2:14:1 type main phase, grain boundary phase, and/or grain boundary corner phase of the ring magnet; preferably, the target permeation source includes 35-99.99 wt % of a permeation additive and 0.1-65 wt % of a monomer and/or a compound that is permeable into main phase, grain boundary phase, and/or grain boundary corner phase of the R—Fe—B magnet.

Specifically, the above target permeation source includes: 35-96.4 wt % of any one or more selected from the group consisting of zirconium oxide, magnesium oxide, aluminum oxide, and titanium oxide, 0.1-5 wt % of metal gallium, 2-30% of terbium fluoride, 1-5% of dysprosium fluoride, and 0.5-25 wt % of zirconium powder and/or niobium powder;

Alternatively, the target permeation source includes: 55-94.4 wt % of any one or more selected from the group consisting of zirconium oxide, magnesium oxide, aluminum oxide, and titanium oxide, 0.1-5 wt % of metal gallium, 5-35% of terbium fluoride, and 0.5-5 wt % of carbonyl cobalt powder;

Alternatively, the target permeation source includes 55-99.9 wt % of any one or more selected from the group consisting of zirconium oxide, magnesium oxide, aluminum oxide or titanium oxide, 0.1-5 wt % of metal gallium, 0-35% of terbium fluoride, 0-2 wt % carbonyl cobalt powder, and 0-3 wt % of niobium powder or zirconium powder;

Alternatively, the target permeation source includes 30-98.5 wt % of any one or more selected from the group consisting of zirconium oxide, magnesium oxide, aluminum oxide or titanium oxide, 0.1-5 wt % of metal gallium, 0.2-25% of terbium fluoride, 0.5-20% of dysprosium fluoride, 0.2-10 wt % of carbonyl cobalt powder, and 0.5-10 wt % of niobium powder or zirconium powder or titanium powder.

The present invention has the following remarkable technical effects:

(1) The present invention for the first time proposes to repair the internal defects of the magnet in movement permeation. This repairing treatment method is particularly suitable for industrialized or large-scale production. Compared with methods such as filming, coating, and powder covering, a permeation amount of the target elements entering the inside of the magnet is controllable, the permeation is uniform. The invention is particularly suitable for permeation reaction of a target permeation substance with high viscosity or a low melting point, has a wide range of choice for the raw materials, and has excellent permeation effect.

(2) In the present invention the target permeation source maintains the relative macro movement with the ring magnet, high-hardness particles such as aluminum oxide and zirconium oxide in the target permeation source serve a friction cleaning function to the inner surface and the outer surface of the magnet. As the ring magnet continuously exposes a fresh surface, the target permeation elements continuously permeate and diffuse, thus promoting the permeation reaction to be carried out constantly, solving the technical problems of low permeation reaction efficiency, limited permeation depth of the target elements, and uncontrollable permeation amount in the industrial production; meanwhile, it further solves the problem of a large amount of loss in the diffusion reaction once a permeation substance having a relatively low melting point is added to the permeation raw materials in the prior art, and the problem that it is difficult to perform diffusion reaction due to poor fluidity when a permeation substance having relatively high viscosity is added.

(3) Compared with current commonly used methods, such as sputtering, coating, and powder covering, in the present invention, the permeation amount of the target permeation elements entering the inside of the magnet is easy to control, the permeation is uniform, and is no longer limited by the melting point, physical property, or state of the permeation raw material. The raw materials have a wide range of choice and a low cost. The permeation effect is good. The coercivity and thermal stability of the oriented sintered magnet can be improved stably.

(4) The target permeation elements in the present invention substantially have no loss, the target elements contacting the magnet and taking part in the permeation directly diffuse into the magnet, the target elements not diffusing or permeating still remain in the permeation source in an original state, and can continue to be used next time; however, all of the processes such as coating, filming, and powder covering in the prior art have membrane, powder or other residues that do not take part in the permeation or fail to permeate completely after the permeation reaction is ended, and all of them become waste residues; therefore, compared with the conventional permeation processes, the present invention has high utilization ratio of the permeation elements substantially with no loss, and a low cost, thus being suitable for industrialized production.

(5) The method of the present invention can stably improve the magnetic properties and the thermal stability of the oriented sintered magnet, particularly functions to enhance the radially oriented sintered ring magnet, and the magnetic property test indicates that the radially oriented sintered ring magnet, compared with that before the treatment, is improved in the coercivity by 30-50%, decreased in the remanence by less than 3%, and decreased in the magnetic flux heat loss by 3-10% when the ring magnet is heated from a room temperature to 120° C. and then back to the room temperature.

(6) In the permeating treatment of the present invention, the system of heating at variable rate and heat preservation in sections is used to optimize process parameters such as heating rate, heat preservation temperature, and time in each section, which effectively avoids the problems such as cracking and deformation of the ring magnet appearing in the permeation, such that the permeation is uniform, the permeation reaction efficiency is high, and thus significantly improving the quality and yield rate of the oriented sintered ring magnet treated in industrial scale, and having a broad industrial application value.

DETAILED DESCRIPTION OF EMBODIMENTS

The present invention is further described in detail below in combination with embodiments, while the scope of protection of the present invention is not limited thereto.

Example 1

A composition for permeation of sintered oriented magnet includes following ingredients: 55-99.99 wt % of any one or more selected from the group consisting of zirconium oxide, magnesium oxide, aluminum oxide or titanium oxide, 0.1-5 wt % of metal gallium, 0-35% of terbium fluoride, 0-2 wt % of carbonyl cobalt powder, and 0-3 wt % of niobium powder or zirconium powder.

A method of using the composition in this example for permeation of sintered magnet includes following preparation steps:

A. preparing magnetic powder to be molded according to given components and ratios, followed by oriented molding, and then sintering to obtain an oriented sintered magnet, wherein an oriented magnetic field and the magnetic powder have relative rotation therebetween in the molding; the magnetic powder has following components and ratios (percentage by weight): rare-earth Pr and Nd in a total content of 28-31%, Dy+Tb+Ho in a total content of 2-5%, Co in a content of 0.2-0.8%, B in a content of 0.95-1.15%, Nb in a content of 0.2-1%, Cu in a content of ≤0.20%, Al in a content of 0.2-1.0%, a balance of Fe and inevitable impurities;

B. pre-treatment: removing pollutants, rust, and an oxide layer from a surface of the magnet, wherein preferably, an inner surface and an outer surface of the magnet are first subjected to rough processing before the pre-treatment, which is more advantageous to internal microstructure of the magnet to be repaired;

C. preparing the composition as a target permeation source: according to proportions of the above composition, performing high-temperature baking at a temperature of above 1050° C. in advance for any one or more raw materials selected from the group consisting of zirconium oxide, magnesium oxide, aluminum oxide or titanium oxide, then heating and melting the metal gallium and adding the melted metal gallium to the baked raw material powder to form a pre-mixture, afterwards, adding terbium fluoride, carbonyl cobalt powder, and niobium powder (or zirconium powder) having baked at temperatures 120° C. sequentially to the preceding pre-mixture to obtain the target permeation source after mixing them well;

D. permeating treatment during rotation: disposing the oriented sintered magnet having undergone the pre-treatment in step B and the target permeation source substance prepared in step C into a vacuum, rotatable, and heatable container according to a volume ratio of 1:1-1:100 for permeating treatment, wherein in a permeation process, the magnet and the target permeation source substance have rotational movement therebetween all the time at a rotational velocity of 0.01 rpm-6000 rpm, preferably 0.5-1000 rpm, and more preferably 0.5-500 rpm or 1-100 rpm; in the movement permeation, the container is first vacuumized to below 6 Pa, preferably below $6\times10^{-2}$ Pa, afterwards, the container continues to maintain the above vacuum condition or is filled with an inert gas, specifically nitrogen or argon; in order to avoid problems such as deformation and cracking of the magnet due to non-uniform heating, a system of heating at a variable rate and multi-section permeation and heat preservation is used: the container is heated at a heating rate of 3-8° C./min to 700° C. and the temperature is kept at 700° C. for 1.5 h, then heated at a rate of 1-3° C./min to 870° C. and the temperature is kept at 870° C. for 3-10 h, then heated at a rate of 0.5-2° C./min to 880-950° C. and the temperature is kept at 880-950° C. for 15-40 h, afterwards rapidly cooled or naturally cooled to 40-80° C., wherein in the cooling, vacuum or an inert-gas protective atmosphere is kept, and the magnet still maintains relative rotational movement with respect to the target permeation source;

E. after the movement permeating treatment is ended, separating the magnet from the target permeation source substance, and subjecting the magnet to tempering treatment at 450-550° C. for 3-8 h; and F. obtaining a product after the tempering treatment.

Tests of magnetic properties indicate: the oriented sintered magnet before the treatment in the present example has following typical magnetic properties and thermal stability: remanence Br of 13.01 kGs, coercivity Hcj of 18.27 kOe, magnetic energy product (BH)max of 40.6 MGOe, and magnetic flux heat loss of −11.9% when the magnet is heated from room temperature to 120° C. and then back to the room temperature.

The oriented sintered magnet after the treatment has following typical magnetic properties and thermal stability: remanence Br of 12.70 kGs, coercivity Hcj of 25.70 kOe, magnetic energy product (BH)max of 38.21 MGOe, and decreased magnetic flux heat loss of −2.3% when the magnet is heated from room temperature to 120° C. and then back to the room temperature.

Thus, the sintered magnet after the treatment in the present example, compared with that before the treatment, is stably improved in the coercivity by nearly 40%, decreased in the remanence by less than 3%, and decreased in the magnetic flux heat loss to less than 3% when the magnet is heated from room temperature to 120° C. and then back to the room temperature, thus the sintered magnet after the treatment is remarkably improved in both the magnetic properties and the thermal stability.

The oriented sintered magnet in this example specifically may be oriented sintered ring magnet, oriented sintered arc magnet, oriented sintered sheet magnet and so on.

Example 2

A composition for permeation of sintered oriented magnet includes: 30-98.5 wt % of any one or more selected from the group consisting of zirconium oxide or magnesium oxide or aluminum oxide or titanium oxide, 0.1-5 wt % of metal gallium, 0.2-25% of terbium fluoride, 0.5-20% of dysprosium fluoride, 0.2-10 wt % of carbonyl cobalt powder, and 0.5-10 wt % of niobium powder or zirconium powder or titanium powder.

A method of using the composition in this example for permeation of sintered magnet includes following preparation steps:

A. preparing magnetic powder to be molded according to given components and ratios, followed by oriented molding, and then sintering to obtain an oriented sintered magnet, wherein an oriented magnetic field and the magnetic powder have relative rotation therebetween in the molding; the magnetic powder has following components and ratios (percentage by weight): rare-earth Pr and Nd in a total content of 28-30%, Tb+Dy in a total content of 2-3%, Ho in a content of 0.5-2.0%, Co in a content of 0.1-0.5%, B in a content of 0.95-1.1%, Nb+Zr in a total content of 0.5-2.0%, Cu in a content of 0.05-1.0%, Al in a content of 0.05-1.0%, Ti in a content of 0.02-1.0%, a balance of Fe and inevitable impurities;

B. pre-treatment: removing pollutants, rust, and an oxide layer from a surface of the magnet, wherein preferably, an inner surface and an outer surface of the magnet are first subjected to rough processing before the pre-treatment, which is more advantageous to internal microstructure of the magnet to be repaired;

C. preparing a target permeation source: performing high-temperature baking at a temperature of above 1050° C. in advance for a raw material zirconium oxide (or magnesium oxide or aluminum oxide or titanium oxide), then heating and melting the metal gallium and adding the melted metal gallium to power of zirconium oxide (or magnesium oxide, aluminum oxide, titanium oxide), adding terbium fluoride, dysprosium fluoride, carbonyl cobalt powder, and niobium powder or zirconium powder or titanium powder having baked at 120°

C. sequentially to a pre-mixture of metal gallium and zirconium oxide (or magnesium oxide or aluminum oxide), to obtain a target permeation source substance after mixing them well;

D. permeating treatment during rotation: disposing the oriented sintered magnet having undergone the pre-treatment in step B and the target permeation source substance prepared in step C into a vacuum, rotatable, and heatable container in batches according to a volume ratio of 1:1-1:100 for permeating treatment, wherein in a permeation process, the magnet and the target permeation source substance have rotational movement therebetween all the time at a rotational velocity of 0.01 rpm-6000 rpm, preferably 0.5-1000 rpm, and more preferably 0.5-500 rpm or 1-100 rpm; in the movement permeation, the container is first vacuumized to below 6 Pa, preferably below $6\times10^{-2}$ Pa, afterwards, the container continues to maintain the above vacuum condition or is filled with an inert gas, specifically nitrogen or argon; in order to avoid problems such as deformation and cracking of the magnet due to non-uniform heating, a system of heating at a variable rate and multi-section permeation and heat preservation is used: the container is heated at a heating rate of 3-8° C./min to 650-800° C. and the temperature is kept at 650-800° C. for 2 h in a first section, then heated at a rate of 0.5-3° C./min to 850-950° C. and the temperature is kept at 850-950° C. for 2-20 h in a second section, wherein the heating rate in the first section is higher than the heating rate in the second section, afterwards rapidly cooled or naturally cooled to 40-60° C., wherein in the cooling, vacuum or an inert-gas protective atmosphere is kept, and the magnet still maintains relative rotational movement with respect to the target permeation source; and E. after the movement permeating treatment is ended, taking out the magnet, and subjecting the magnet to tempering treatment at 550-600° C. for 4 h.

Tests of magnetic properties indicate: the oriented sintered magnet before the treatment in the present example has following typical magnetic properties and thermal stability: remanence Br of 13.31 kGs, coercivity Hcj of 18.83 kOe, magnetic energy product (BH)max of 40.26 MGOe, and magnetic flux heat loss of −10.4% when the magnet is heated from room temperature to 120° C. and then back to the room temperature.

The oriented sintered magnet after the treatment has following typical magnetic properties and thermal stability: remanence Br of 12.8 kGs, coercivity Hcj of 24.71 kOe, magnetic energy product (BH)max of 38.4 MGOe, and decreased magnetic flux heat loss of −2.9% when the magnet is heated from room temperature to 120° C. and then back to the room temperature.

Thus, the sintered magnet after the treatment in the present example, compared with that before the treatment, is stably improved in the coercivity by 30%, decreased in the remanence by less than 4%, and decreased in the magnetic flux heat loss from −10.4% before the treatment to −2.9% when the magnet is heated from room temperature to 120° C. and then back to the room temperature, thus the sintered magnet after the treatment is remarkably improved in both the magnetic properties and the thermal stability.

Further analysis indicates that by controlling ingredient ratios of various elements in the target permeation source prepared in step C, the rotational velocity in step D, and a highest permeation temperature and time, amounts of the above elements entering the main phase, amounts of the above elements entering the grain boundary phase, and amounts of the above elements entering the grain boundary corner phase can be adjusted and controlled.

The oriented sintered magnet in this example specifically may be oriented sintered ring magnet, oriented sintered arc magnet, oriented sintered sheet magnet and so on.

Example 3

In the present example, an oriented sintered ring magnet has following components and ratios (percentage by weight): rare-earth Pr and Nd in a total content of 29-31%, Dy in a content of 1-2.5%, Co in a content of 0.8-1.2%, B in a content of 0.95-1.1%, Nb in a content of 0.10-0.35%, Cu in a content of 10.20%, Al in a content of 0.10-0.3%, a balance of Fe and inevitable impurities.

Following preparation steps are included:

A. preparing magnetic powder to be molded according to the above components and ratios, followed by radially oriented molding, and then sintering, wherein a radial orientation and molding step includes: (1) filling a mold cavity with the magnetic powder to be molded, providing an inner magnetic pole inside the mold cavity, and providing an outer magnetic pole outside the mold cavity; (2) rotating the outer magnetic pole relative to the mold cavity, or rotating the mold cavity relative to the outer magnetic pole, wherein an oriented magnetic field is generated between the inner magnetic pole and the outer magnetic pole, and the oriented magnetic field and the magnetic powder have relative rotation therebetween for magnetization and radial orientation of the magnetic powder; (3) while rotating, applying a gradually increased pressure to compress and mold the magnetic powder, to obtain a radially oriented ring magnet. Alternatively, the radial orientation and molding step includes: (1) filling a mold cavity with the magnetic powder to be molded, providing a magnetic core inside the mold cavity, and providing a plurality of outer magnetic poles symmetrically outside the mold cavity; (2) rotating the plurality of outer magnetic poles simultaneously with respect to the mold cavity, or rotating the mold cavity with respect to the outer magnetic poles, wherein a plurality of oriented magnetic fields are generated between the magnetic core and the plurality of outer magnetic poles, and the oriented magnetic fields and the magnetic powder have relative rotation therebetween for magnetization and radial orientation of the magnetic powder; (3) while rotating, applying a gradually increased pressure to compress and mold the magnetic powder, to obtain a radially oriented ring magnet blank, which blank is subjected to vacuum sintering at 1000-1100° C. to obtain the radially oriented ring magnet;

B. pre-treatment: removing pollutants, rust, and an oxide layer from a surface of the ring magnet, wherein preferably, an inner surface and an outer surface of the radially oriented ring magnet are first subjected to rough processing, which is more advantageous to internal microstructure of the ring magnet to be permeated;

C. preparing a target permeation source: components and ratios of the target permeation source mainly being as follows: 53-94.4 wt % of zirconium oxide, 0.1-4 wt % of metal gallium, 5-35% of terbium fluoride, and 0.5-8 wt % of carbonyl cobalt powder; performing high-temperature baking at a temperature of above 1000° C. in advance for the raw material zirconium oxide, then heating and melting the metal gallium and adding the melted metal gallium to zirconium oxide powder, adding terbium fluoride and carbonyl cobalt powder having baked at 120° C. sequentially to a pre-mixture of the metal gallium and zirconium oxide, to obtain the target permeation source after mixing them well;

D. permeating treatment during rotation: adding the radially oriented sintered ring magnet having undergone the pre-treatment in step B and the target permeation source substance prepared in step C into a vacuum, rotatable, and heatable container according to a volume ratio of 1:1-1:100 for permeating treatment, wherein in a permeation process, there is always rotational movement between the ring magnet and the target permeation source substance at a rotational velocity of 0.5-500 rpm; in the movement permeation, the container is first vacuumized to below 6 Pa, preferably below $10^{-3}$ Pa, afterwards, the container continues to maintain the above vacuum condition or is filled with an inert gas, specifically nitrogen or argon; a system of the rotational permeation process is as follows: a system of permeation and heat preservation is as follows: the container is heated at a heating rate of 3-8° C./min to 650° C. and the temperature is kept at 650° C. for 2-5 h, then heated at a heating rate of 0.5-3° C./min to 850-950° C. and the temperature is kept at 850-950° C. for 5-15 h, afterwards rapidly cooled or naturally cooled to 40° C., wherein in the cooling, vacuum or an inert-gas protective atmosphere is kept, and the ring magnet still maintains relative rotational movement with respect to the target permeation source;

E. after the movement permeating treatment is ended, taking out the ring magnet, and subjecting the ring magnet to tempering treatment at 450-550° C. for 2-8 h; and F. obtaining a product after the tempering treatment.

Tests of magnetic properties indicate: the radially oriented sintered ring magnet before the treatment in the present example has following typical magnetic properties and thermal stability: remanence Br of 13.36 kGs, coercivity Hcj of 14.51 kOe, magnetic energy product (BH)max of 41.96 MGOe, and magnetic flux heat loss of −13.01% when the ring magnet is heated from room temperature to 120° C. and then back to the room temperature.

The radially oriented sintered ring magnet after being treated with the method in the present example has following typical magnetic properties and thermal stability: remanence Br of 12.97 kGs, coercivity Hcj of 19.79 kOe, magnetic energy product (BH)max of 40.90 MGOe, and decreased magnetic flux heat loss of −3.8% when the ring magnet is heated from room temperature to 120° C. and then back to the room temperature. Thus, the radially oriented sintered ring magnet after the treatment in the present invention, compared with that before the treatment, is improved in the coercivity by more than 50%, decreased in the remanence by less than 3%, and is improved in the comprehensive magnetic properties (BH)max+Hcj by nearly 7.5%, and has magnetic flux heat loss of ≤5% when the ring magnet is heated from room temperature to 120° C. and then back to the room temperature, thus the radially oriented ring magnet after the treatment is remarkably enhanced in both the magnetic properties and the thermal stability.

Further SEM observation and energy spectroscopy analysis indicate that the treated ring magnet includes following phase composition: ≥92% in volume of 2:14:1 main phase, 0.1-8% in volume of grain boundary phase or phase, solid solution in grain boundary corner, wherein contents of elements O, C, and N in the grain boundary phase or in the grain boundary corner are higher than contents of the elements O, C, and N in the main phase, contents of Nb, Cu, and Al in the grain boundary phase are higher than contents thereof in the main phase, and a content of the rare-earth in the main phase is higher than a content thereof in the grain boundary phase or the grain boundary corner.

Example 4

In the present example, an oriented sintered ring magnet has following components and ratios (percentage by weight): rare-earth Pr and Nd in a total content of 30-32%, Dy+Tb in a total content of 1.5-4.0%, Ni in a content of 0.20-2.0%, B in a content of 0.95-1.1%, Nb+Zr in a total content of 1.0c)/O, Cu in a content of 0.02-0.25%, Al in a content of ≤0.50%, a balance of Fe and inevitable impurities.

Following preparation steps are included:

A. preparing magnetic powder to be molded according to the above components and ratios, followed by radially oriented molding, and then sintering, wherein a radial orientation and molding step includes: (1) filling a mold cavity with the magnetic powder to be molded, providing an inner magnetic pole inside the mold cavity, and providing an outer magnetic pole outside the mold cavity; (2) rotating the outer magnetic pole relative to the mold cavity, or rotating the mold cavity relative to the outer magnetic pole, wherein an oriented magnetic field is generated between the inner magnetic pole and the outer magnetic pole, and the oriented magnetic field and the magnetic powder have relative rotation therebetween for magnetization and radial orientation of the magnetic powder; (3) while rotating, applying a gradually increased pressure to compress and mold the magnetic powder, to obtain a radially oriented ring magnet. Alternatively, the radial orientation and molding step includes: (1) filling a mold cavity with the magnetic powder to be molded, providing a magnetic core inside the mold cavity, and providing a plurality of outer magnetic poles symmetrically outside the mold cavity; (2) rotating the plurality of outer magnetic poles simultaneously with respect to the mold cavity, or rotating the mold cavity with respect to the outer magnetic poles, wherein a plurality of oriented magnetic fields are generated between the magnetic core and the plurality of outer magnetic poles, and the oriented magnetic fields and the magnetic powder have relative rotation therebetween for magnetization and radial orientation of the magnetic powder; (3) while rotating, applying a gradually increased pressure to compress and mold the magnetic powder, to obtain a radially oriented ring magnet blank, which blank is subjected to vacuum sintering at 1000-1100° C. to obtain the radially oriented ring magnet;

B. pre-treatment: removing pollutants, rust, and an oxide layer from a surface of the ring magnet, wherein preferably, an inner surface and an outer surface of the radially oriented ring magnet are first subjected to rough processing, which is more advantageous to internal microstructure of the ring magnet to be permeated;

C. preparing a target permeation source: components and ratios of the target permeation source mainly being as follows: 55-96.4 wt % of any one or more selected from the group consisting of zirconium oxide, magnesium oxide, and aluminum oxide, 0.1-5 wt % of metal gallium, 2-30% of terbium fluoride, 1-5% of dysprosium fluoride, and 0.5-5 wt % of niobium powder; performing high-temperature baking at a temperature of above 1050° C. in advance for the raw material power zirconium oxide, magnesium oxide, and aluminum oxide, then heating and melting the metal gallium and adding the melted metal gallium to the above powder to form a pre-mixture, adding terbium fluoride, 1-5% of dysprosium fluoride, and niobium powder having baked at 120° C. sequentially to the above pre-mixture, to obtain the target permeation source substance after mixing them well;

D. permeating treatment during rotation: disposing the radially oriented sintered ring magnet having undergone the pre-treatment in step B and the target permeation source substance prepared in step C into a vacuum, rotatable, and heatable container according to a volume ratio of 1:1-1:100 for permeating treatment, wherein in a permeation process, there is always rotational movement between the ring magnet and the target permeation source substance at a rotational velocity of 2-1000 rpm, preferably 10-200 rpm; in the movement permeation, the container is first vacuumized to below 6 Pa, preferably below $10^{-3}$ Pa, afterwards, the container continues to maintain the above vacuum condition or is filled with an inert gas, specifically nitrogen or argon; a system of rotational permeation and heat preservation is as follows: the container is heated at a heating rate of 3-8° C./min to 700° C. and the temperature is kept at 700° C. for 1-2 h, then heated at a rate of 0.5-1° C./min to 800-900° C. and the temperature is kept at 800-900° C. for 8-12 h, afterwards rapidly cooled or naturally cooled to 60° C., wherein in the cooling, vacuum or an inert-gas protective atmosphere is kept, and the ring magnet still maintains relative rotational movement with respect to the target permeation source;

E. after the movement permeating treatment is ended, taking out the ring magnet, and subjecting the ring magnet to tempering treatment at 450-550° C. for 2-10 h; and F. obtaining a product after the tempering treatment.

Tests of magnetic properties indicate: the radially oriented sintered ring magnet before the treatment in the present example has following typical magnetic properties and thermal stability: remanence Br of 13.83 kGs, coercivity Hcj of 16.38 kOe, magnetic energy product (BH)max of 43.8 MGOe, and magnetic flux heat loss of −11.6% when the ring magnet is heated from room temperature to 120° C. and then back to the room temperature.

The radially oriented sintered ring magnet after the treatment with the method in the present example has following typical magnetic properties and thermal stability: remanence Br of 12.76 kGs, coercivity Hcj of 23.89 kOe, magnetic energy product (BH)max of 41.6 MGOe, and decreased magnetic flux heat loss of −3.1% when the ring magnet is heated from room temperature to 120° C. and then back to the room temperature.

Thus, the radially oriented sintered ring magnet after the treatment in the present example, compared with that before the treatment, is improved in the coercivity by nearly 40%, decreased in the remanence by less than 3%, improved in the comprehensive magnetic properties (BH)max+Hcj by nearly 8.8%, thus the radially oriented ring magnet after the treatment is remarkably improved in both the magnetic properties and the thermal stability.

Further analysis indicates that the treated ring magnet includes following phase composition: ≥93% in volume of 2:14:1 main phase, 0.5-7% in volume of grain boundary phase or phase, solid solution in grain boundary corner, wherein contents of elements O, C, and N in the grain boundary phase or in the grain boundary corner are higher than contents of the elements O, C, and N in the main phase; contents of rare-earth Nb, Pr, Tb, and Dy in the main phase are higher than contents thereof in the grain boundary phase or the grain boundary corner, and contents of Nb, Zr, Cu, and Al in the grain boundary phase are higher than contents thereof in the main phase.

Example 5

In the present example, an oriented sintered ring magnet has following components and ratios (percentage by weight): rare-earth Pr and Nd in a total content of 28-30%, Dy+Tb in a total content of 1.0-4%, Ni in a content of 0.20-2.0%, B in a content of 0.95-1.1%, Zr in a content of 0.2-1.0%, Cu in a content of 0.1-1.0%, Al in a content of 0.2-2.0%, Co in a content of 0.8-1.5%, a balance of Fe and inevitable impurities.

Following preparation steps are included:

A. preparing magnetic powder to be molded according to the above components and ratios, followed by radially oriented molding, and then sintering, wherein a radial orientation and molding step includes: (1) filling a mold cavity with the magnetic powder to be molded, providing an inner magnetic pole inside the mold cavity, and providing an outer magnetic pole outside the mold cavity; (2) rotating the outer magnetic pole relative to the mold cavity, or rotating the mold cavity relative to the outer magnetic pole, wherein an oriented magnetic field is generated between the inner magnetic pole and the outer magnetic pole, and the oriented magnetic field and the magnetic powder have relative rotation therebetween for magnetization and radial orientation of the magnetic powder; (3) while rotating, applying a gradually increased pressure to compress and mold the magnetic powder, to obtain a radially oriented ring magnet. Alternatively, the radial orientation and molding step includes: (1) filling a mold cavity with the magnetic powder to be molded, providing a magnetic core inside the mold cavity, and providing a plurality of outer magnetic poles symmetrically outside the mold cavity; (2) rotating the plurality of outer magnetic poles simultaneously with respect to the mold cavity, or rotating the mold cavity with respect to the outer magnetic poles, wherein a plurality of oriented magnetic fields are generated between the magnetic core and the plurality of outer magnetic poles, and the oriented magnetic fields and the magnetic powder have relative rotation therebetween for magnetization and radial orientation of the magnetic powder; (3) while rotating, applying a gradually increased pressure to compress and mold the magnetic powder, to obtain a radially oriented ring magnet blank, which blank is subjected to vacuum sintering at 1000-1100° C. to obtain the radially oriented ring magnet;

B. pre-treatment: removing pollutants, rust, and an oxide layer from a surface of the ring magnet, wherein preferably, an inner surface and an outer surface of the radially oriented ring magnet are first subjected to rough processing, which is more advantageous to internal microstructure of the ring magnet to be permeated;

C. preparing a target permeation source: components and ratios of the target permeation source mainly being as follows: 60-96.9 wt % of aluminum oxide, 0.1-5 wt % of metal gallium, 1-5% of dysprosium fluoride, 1-25% of terbium fluoride, and 0.5-2 wt % of zirconium powder; performing high-temperature baking at a temperature of above 1100° C. in advance for the raw material powder aluminum oxide, then heating and melting the metal gallium and adding the melted metal gallium to the above powder to form a pre-mixture, adding terbium fluoride, 1-5% of dysprosium fluoride, and zirconium powder having baked at 120° C. sequentially to the above pre-mixture, to obtain the target permeation source substance after mixing them well;

D. permeating treatment during rotation: disposing the radially oriented sintered ring magnet having undergone the pre-treatment in step B and the target permeation source substance prepared in step C into a vacuum, rotatable, and heatable container according to a volume ratio of 1:1-1:100 for permeating treatment, wherein in a permeation process, the ring magnet and the target permeation source substance have rotational movement therebetween all the time at a rotational velocity of 2-1000 rpm, preferably 10-200 rpm; in the movement permeation, the container is first vacuumized to below 6 Pa, preferably below $10^{-3}$ Pa, afterwards, the container continues to maintain the above vacuum condition or is filled with an inert gas, specifically nitrogen or argon; a system of rotational permeation and heat preservation is as follows: the container is heated at a heating rate of 3-8° C./min to 800° C. and the temperature is kept at 800° C. for 1-5 h, then heated at a rate of 0.5-1.5° C./min to 850-920° C. and the temperature is kept at 850-920° C. for 5-15 h, afterwards rapidly cooled or naturally cooled to 80° C., wherein in the cooling, vacuum or an inert-gas protective atmosphere is kept, and the ring magnet still maintains relative rotational movement with respect to the target permeation source;

E. after the movement permeating treatment is ended, taking out the ring magnet, and subjecting the ring magnet to tempering treatment at 400-550° C. for 2-6 h; and F. obtaining a product after the tempering treatment.

Tests of magnetic properties indicate: the radially oriented sintered ring magnet before the treatment in the present example has following typical magnetic properties and thermal stability: remanence Br of 13.53 kGs, coercivity Hcj of 15.81 kOe, magnetic energy product (BH)max of 42.2 MGOe, and magnetic flux heat loss of −11.20% when the ring magnet is heated from room temperature to 120° C. and then back to the room temperature.

The radially oriented sintered ring magnet after the treatment with the method in the present example has following typical magnetic properties and thermal stability: remanence Br of 13.06 kGs, coercivity Hcj of 22.65 kOe, magnetic energy product (BH)max of 40.9 MGOe, and decreased magnetic flux heat loss of −2.8% when the ring magnet is heated from room temperature to 120° C. and then back to the room temperature.

Thus, the radially oriented sintered ring magnet after the treatment in the present example, compared with that before the treatment, is improved in the coercivity by nearly 40%, decreased in the remanence by less than 4%, improved in the comprehensive magnetic properties (BH)max+Hcj by 9.6%, and also remarkably improved in the thermal stability of the ring magnet.

Further SEM observation and energy spectroscopy analysis indicate that the treated ring magnet includes following phase composition: ≥92% in volume of 2:14:1 main phase, 0.1-8% in volume of grain boundary phase or phase, solid solution in grain boundary corner, wherein contents of elements O, C, and N in the grain boundary phase or in the grain boundary corner are higher than contents of the elements O, C, and N in the main phase, contents of Nb, Cu, and Al in the grain boundary phase are higher than contents thereof in the main phase, and contents of rare-earth Nb, Pr, Tb, and Dy in the main phase are higher than contents thereof in the grain boundary phase or in the grain boundary corner.

Example 6

In the present example, a sintered magnet has following components and ratios (percentage by weight): rare-earth Pr and Nd in a total content of 30.5%, Dy+Ho in a total content of 1.35%, Co in a content of 1.0%, B in a content of 1.0%, Nb in a content of 0.2%, Cu in a content of ≤0.20%, Al in a content of 0.2%, a balance of Fe and inevitable impurities.

Following preparation steps are included:

A. preparing magnetic powder to be molded according to the above components and ratios, followed by oriented molding, and then sintering, wherein an oriented magnetic field and the magnetic powder have relative rotation therebetween;

B. pre-treatment: removing pollutants and rust from a surface of the magnet, wherein preferably, an inner surface and an outer surface of the oriented magnet are first subjected to rough processing, which is more advantageous to internal microstructure of the magnet to be repaired;

C. preparing a target permeation source: the target permeation source mainly being as follows: 55-94.4 wt % of any one or more selected from the group consisting of zirconium oxide, magnesium oxide, aluminum oxide, and titanium oxide, 0.1-5 wt % of metal gallium, 5-35% of terbium fluoride, and 0.5-5 wt % of carbonyl cobalt powder; performing high-temperature baking at a temperature of above 1000° C. in advance for raw material powder zirconium oxide, magnesium oxide, aluminum oxide, or titanium oxide, then heating and melting the metal gallium and adding the melted metal gallium to the above raw material powder to form a pre-mixture, adding terbium fluoride and carbonyl cobalt powder having baked at 120° C. sequentially to the above pre-mixture, to obtain the target permeation source substance after mixing them well;

D. permeating treatment during rotation: disposing the oriented sintered magnet having undergone the pre-treatment in step B and the target permeation source substance prepared in step C into a vacuum, rotatable, and heatable container in batches according to a volume ratio of 1:1-1:100 for permeating treatment, wherein in a permeation process, the magnet and the target permeation source substance have rotational movement therebetween all the time at a rotational velocity of 0.01 rpm-6000 rpm, preferably 0.5-1000 rpm, and more preferably 0.5-500 rpm or 1-100 rpm; in the movement permeation, the container is first vacuumized to below 6 Pa, preferably below $6\times10^{-3}$ Pa, afterwards, an inert gas, specifically nitrogen or argon, is filled; in order to avoid problems such as deformation and cracking of the magnet due to non-uniform heating, a system of gentle heating and multi-section permeation and heat preservation is used, wherein the container is heated at a heating rate of 3-8° C./min to 550° C., then heated at a rate of 2-5° C./min to 800° C. and the temperature is kept at 800° C. for 3 h, then heated at a rate of 0.5-3° C./min to 850-950° C. and the temperature is kept at 850-950° C. for 35 h, afterwards rapidly cooled or naturally cooled to 40-60° C., wherein in the cooling, an inert-gas protective atmosphere is kept, and the magnet still maintains relative rotational movement with respect to the target permeation source; and E. after the movement permeating treatment is ended, taking out the magnet, and subjecting the magnet to tempering treatment at 450-550° C. for 3.5 h.

Tests of magnetic properties indicate: the oriented sintered magnet before the treatment in the present example has following typical magnetic properties and thermal stability: remanence Br of 13.36 kGs, coercivity Hcj of 14.57 kOe, magnetic energy product (BH)max of 42.2 MGOe, and magnetic flux heat loss of −12.7% when the magnet is heated from room temperature to 120° C. and then back to the room temperature.

The sintered magnet after being treated with the method of the present example has following typical magnetic properties and thermal stability: remanence Br of 12.83 kGs, coercivity Hcj of 20.86 kOe, magnetic energy product (BH)max of 41.3 MGOe, and decreased magnetic flux heat loss of −2.3% when the magnet is heated from room temperature to 120° C. and then back to the room temperature.

Thus, the sintered magnet after the treatment in the present example, compared with that before the treatment, is stably improved in the coercivity by more than 40%, decreased in the remanence by less than 4%, and has magnetic flux heat loss of less than 2.3% when the magnet is heated from room temperature to 120° C. and then back to the room temperature, thus the sintered magnet after the treatment is remarkably improved in both the magnetic properties and the thermal stability.

Further analysis indicates that the treated magnet includes following phase composition: ≥90% in volume of 2:14:1 main phase, ≤10% in volume of grain boundary phase or phase, solid solution in grain boundary corner, wherein contents of elements O, C, F, and N in the grain boundary phase or in the grain boundary corner are higher than contents thereof in the main phase, contents of Nb, Cu, Al, and Ga in the grain boundary phase are higher than contents thereof in the main phase, and contents of rare-earth Nd, Pr, Tb, Dy, and Ho in the main phase are higher than contents thereof in the grain boundary phase or the grain boundary corner.

Example 7

In the present example, a sintered magnet has following components and ratios (percentage by weight): rare-earth Pr and Nd in a total content of 29.5-31%, Dy+Ho in a total content of 0.5-1.5%, Co in a content of 0.1-1.0%, B in a content of 0.9-1.3%, Nb+Zr in a total content of 0.5-2.0%, Cu in a content of ≤0.50%, Al in a content of 1.0%, Ti in a content of ≤0.5%, a balance of Fe and inevitable impurities.

Following preparation steps are included:

A. preparing magnetic powder to be molded according to the above components and ratios, followed by oriented molding, and then sintering, wherein an orientation and molding step includes: (1) filling a mold cavity with the magnetic powder to be molded, providing an inner magnetic pole inside the mold cavity, and providing an outer magnetic pole outside the mold cavity; (2) rotating the outer magnetic pole relative to the mold cavity, or rotating the mold cavity relative to the outer magnetic pole, wherein an oriented magnetic field is generated between the inner magnetic pole and the outer magnetic pole, and the oriented magnetic field and the magnetic powder have relative rotation therebetween for magnetization and orientation of the magnetic powder; (3) while rotating, applying a gradually increased pressure to compress and mold the magnetic powder, to obtain an oriented magnet. Alternatively, the orientation and molding step includes: (1) filling a mold cavity with the magnetic powder to be molded, providing a magnetic core inside the mold cavity, and providing a plurality of outer magnetic poles symmetrically outside the mold cavity; (2) rotating the plurality of outer magnetic poles simultaneously with respect to the mold cavity, or rotating the mold cavity with respect to the outer magnetic poles, wherein a plurality of oriented magnetic fields are generated between the magnetic core and the plurality of outer magnetic poles, and the oriented magnetic fields and the magnetic powder have relative rotation therebetween for magnetization and radial orientation of the magnetic powder; (3) while rotating, applying a gradually increased pressure to compress and mold the magnetic powder, to obtain an oriented magnet;

B. pre-treatment: removing pollutants and rust from a surface of the magnet, wherein preferably, an inner surface and an outer surface of the oriented magnet are first subjected to rough processing, which is more advantageous to internal microstructure of the magnet to be permeated;

C. preparing a target permeation source: components and ratios of the target permeation source mainly being as follows: 35-96.4 wt % of any one or more selected from the group consisting of zirconium oxide, magnesium oxide, aluminum oxide, and titanium oxide, 0.1-5 wt % of metal gallium, 2-30% of terbium fluoride, 1-5% of dysprosium fluoride, and 0.5-25 wt % of zirconium powder and/or niobium powder; performing high-temperature baking at a temperature of above 1050° C. in advance for raw material powder zirconium oxide, magnesium oxide, aluminum oxide, or titanium oxide, then heating and melting the metal gallium and adding the melted metal gallium to the above raw material powder to form a pre-mixture, adding terbium fluoride, dysprosium fluoride, zirconium powder and/or niobium powder having baked at 120° C. sequentially to the above pre-mixture, to obtain the target permeation source substance after mixing them well;

D. permeating treatment during rotation: disposing the oriented sintered magnet having undergone the pre-treatment in step B and the target permeation source substance prepared in step C into a vacuum, rotatable, and heatable container in batches according to a volume ratio of 1:1-1:100 for permeating treatment, wherein the reason of batch addition is preventing damage caused by mutual collision between magnets.

Thereinto, in a permeation process, the magnet and the target permeation source substance have rotational movement therebetween all the time at a rotational velocity of 2-1000 rpm, preferably 10-200 rpm; in the movement permeation, the container is first vacuumized to below 6 Pa, preferably below $6\times10^{-2}$ Pa, afterwards, an inert gas, specifically nitrogen or argon, is filled; in order to avoid problems such as deformation and cracking of the magnet due to nonuniform heating, a system of gentle heating and multi-section permeation and heat preservation is used, wherein the container is heated at a heating rate of 3-8° C./min to 650° C. and the temperature is kept at 650° C. for 1 h, then heated at a rate of 3-5° C./min to 800° C. and the temperature is kept at 800° C. for 2 h, then heated at a rate of 0.5-3° C./min to 850-950° C. and the temperature is kept at 850-950° C. for 16 h, afterwards rapidly cooled or naturally cooled to 40-50° C., wherein in the cooling, an inert-gas protective atmosphere is kept, and the magnet still maintains relative rotational movement with respect to the target permeation source;

E. after the movement permeating treatment is ended, taking out the magnet, and subjecting the magnet to tempering treatment at 550-600° C. for 4 h; and F. after the tempering treatment, obtaining an oriented sintered magnet with improved magnetic properties.

Tests of magnetic properties indicate: the oriented sintered magnet before the treatment in the present example has following typical magnetic properties and thermal stability: remanence Br of 13.21 kGs, coercivity Hcj of 15.65 kOe, magnetic energy product (BH)max of 43.4 MGOe, and magnetic flux heat loss of −12.1% when the magnet is heated from room temperature to 120° C. and then back to the room temperature.

The oriented sintered magnet after being treated with the method in the present example has following typical magnetic properties and thermal stability: remanence Br of 12.78 kGs, coercivity Hcj of 22.27 kOe, magnetic energy product (BH)max of 42.1 MGOe, and decreased magnetic flux heat loss of −2.1% when the magnet is heated from room temperature to 120° C. and then back to the room temperature.

Thus, the oriented sintered magnet after the treatment in the present example, compared with that before the treatment, is improved in the coercivity by 42%, decreased in the remanence by less than 3%, thus the oriented magnet after the treatment is remarkably improved in both the magnetic properties and the thermal stability.

Further observation and analysis indicate that the treated magnet includes following phase composition: 95% in volume of 2:14:1 main phase, 5% in volume of grain boundary phase or phase, solid solution in grain boundary corner, wherein contents of elements O, C, F, and N in the grain boundary phase or the grain boundary corner are higher than contents of O, C, F, and N in the main phase, contents of rare-earth Nb, Pr, Ho, Dy, and Tb in the main phase are higher than contents thereof in the grain boundary phase or the grain boundary corner, and contents of Cu, Zr, Cu, Al, Ga, and Ti in the grain boundary phase are higher than contents thereof in the main phase.

Example 8

A method for repairing internal defects of sintered oriented magnet includes following preparation steps:

A. preparing magnetic powder to be molded according to given components and ratios, followed by oriented molding, and then sintering to obtain an oriented sintered magnet, wherein an oriented magnetic field and the magnetic powder have relative rotation therebetween in the molding; the magnetic powder has following components and ratios (percentage by weight): rare-earth Pr and Nd in a total content of 28-31%, Dy+Tb in a total content of 1.5-6%, Co in a content of 0.2-1%, B in a content of 0.95-1.15%, Nb in a content of 0.2-1%, Cu in a content of ≤0.20%, Al in a content of 0.2-1.0%, a balance of Fe and inevitable impurities;

B. pre-treatment: removing pollutants, rust, and an oxide layer from a surface of the magnet, wherein preferably, an inner surface and an outer surface of the magnet are first subjected to rough processing before the pre-treatment, which is more advantageous to internal microstructure of the magnet to be repaired;

C. preparing a target permeation source: components and ratios of the target permeation source mainly being as follows: 35-99.9 wt % of zirconium oxide or magnesium oxide or aluminum oxide or titanium oxide, 0.1-5 wt % of metal gallium, 0-37% of terbium fluoride, 0-15 wt % of carbonyl cobalt powder, and 0-8 wt % of niobium powder; performing high-temperature baking at a temperature of above 1050° C. in advance for the raw material zirconium oxide or magnesium oxide or aluminum oxide or titanium oxide, then heating and melting the metal gallium and adding the melted metal gallium to powder of zirconium oxide (or magnesium oxide or aluminum oxide or titanium oxide), adding terbium fluoride and carbonyl cobalt powder having baked at 120° C. sequentially to a pre-mixture of the metal gallium and zirconium oxide (or magnesium oxide or aluminum oxide or titanium oxide), to obtain a target permeation source substance after mixing them well;

D. permeating treatment during rotation: disposing the oriented sintered magnet having undergone the pre-treatment in step B and the target permeation source substance prepared in step C into a vacuum, rotatable, and heatable container according to a volume ratio of 1:1-1:100 for permeating treatment, wherein in a permeation process, the magnet and the target permeation source substance have rotational movement therebetween all the time at a rotational velocity of 0.01 rpm-6000 rpm, preferably 0.5-1000 rpm, and more preferably 0.5-500 rpm or 1-100 rpm; in the movement permeation, the container is first vacuumized to below 6 Pa, preferably below $6\times10^{-2}$ Pa, afterwards, an inert gas, specifically nitrogen or argon, is filled; in order to avoid problems such as deformation and cracking of the magnet due to nonuniform heating, a system of gentle heating and multi-section permeation and heat preservation is used, wherein the container is heated at a heating rate of 3-8° C./min to 600° C. and the temperature is kept at 600° C. for 5 h, then heated at a rate of 0.5-3° C./min to 850-1050° C. and the temperature is kept at 850-1050° C. for 8 h, afterwards rapidly cooled or naturally cooled to 40-60° C., wherein in the cooling, an inert-gas protective atmosphere is kept, and the magnet still maintains relative rotational movement with respect to the target permeation source; and E. after the movement permeating treatment is ended, taking out the magnet, and subjecting the magnet to tempering treatment at 410-580° C. for 2-8 h.

Tests of magnetic properties indicate: the oriented sintered magnet before the treatment in the present example has following typical magnetic properties and thermal stability: remanence Br of 13.06 kGs, coercivity Hcj of 18.21 kOe, magnetic energy product (BH)max of 39.06 MGOe, and magnetic flux heat loss of −11.8% when the magnet is heated from room temperature to 120° C. and then back to the room temperature.

The oriented sintered magnet after the treatment in the present example has following typical magnetic properties and thermal stability: remanence Br of 12.64 kGs, coercivity Hcj of 25.79 kOe, magnetic energy product (BH)max of 38.12 MGOe, and decreased magnetic flux heat loss of −2.2% when the magnet is heated from an room temperature to 120° C. and then back to the room temperature.

Thus, the sintered magnet after the treatment in the present example, compared with that before the treatment, is stably improved in the coercivity by nearly 40%, decreased in the remanence by less than 4%, and has magnetic flux heat loss of less than 2.1% when the magnet is heated from room temperature to 120° C. and then back to the room temperature, thus the sintered magnet after the treatment is remarkably improved in both the magnetic properties and the thermal stability.

Further analysis indicates that the treated magnet includes following phase composition: ≥95% in volume of 2:14:1 main phase, about 0.5-5% in volume of a compound, a solid solution formed after any one or more selected from the group consisting of Ga, Nb, Cu, Al, O, C, F, and N entering the grain boundary phase or the grain boundary corner, wherein contents of elements O, C, F, and N in the grain boundary phase are higher than contents thereof in the main phase, contents of Ga, Cu, Al, Nb, and Co in the grain boundary phase are higher than contents thereof in the main phase, and a content of rare-earth in the main phase is higher than a content thereof in the grain boundary phase or the grain boundary corner.

Example 9

A method for repairing internal defects of sintered oriented magnet includes following preparation steps:

A. preparing magnetic powder to be molded according to given components and ratios, followed by oriented molding, and then sintering to obtain an oriented sintered magnet, wherein an oriented magnetic field and the magnetic powder have relative rotation therebetween in the molding; the magnetic powder has following components and ratios (percentage by weight): rare-earth Pr and Nd in a total content of 28-30%, Dy+Tb in a total content of 2-4%, Ho in a content of 0.5-1.0%, Co in a content of 0.1-0.5%, B in a content of 0.95-1.15%, Nb+Zr in a total content of 0.5-2.0%, Cu in a content of 0.50-1.0%, Al in a content of 0.5-1.0%, Ti in a content of 0.2-1.0%, a balance of Fe and inevitable impurities;

B. pre-treatment: removing pollutants, rust, and an oxide layer from a surface of the magnet, wherein preferably, an inner surface and an outer surface of the magnet are first subjected to rough processing before the pre-treatment, which is more advantageous to internal microstructure of the magnet to be repaired;

C. preparing a target permeation source: components and ratios of the target permeation source mainly being as follows: 60-96.4 wt % of zirconium oxide (magnesium oxide, aluminum oxide or titanium oxide), 0.1-5 wt % of metal gallium, 1.5-15% of terbium fluoride, 1.5-15 wt % of dysprosium fluoride, 0.2-2.0 wt % of carbonyl cobalt powder, and 0.3-3 wt % of niobium powder or zirconium fluoride or titanium powder; performing high-temperature baking at a temperature of above 1050° C. in advance for raw material zirconium oxide (magnesium oxide, aluminum oxide or titanium oxide), then heating and melting the metal gallium and adding the melted metal gallium to powder of zirconium oxide (or magnesium oxide or aluminum oxide or titanium oxide), adding terbium fluoride, dysprosium fluoride, carbonyl cobalt powder, niobium powder or zirconium powder or titanium powder having baked at 120° C. sequentially to a pre-mixture of the metal gallium and zirconium oxide (magnesium oxide, aluminum oxide or titanium oxide), to obtain a target permeation source substance after mixing them well;

D. permeating treatment during rotation: disposing the oriented sintered magnet having undergone the pre-treatment in step B and the target permeation source substance prepared in step C into a vacuum, rotatable, and heatable container according to a volume ratio of 1:1-1:100 for permeating treatment, wherein in a permeation process, the magnet and the target permeation source substance have rotational movement therebetween all the time at a rotational velocity of 0.01 rpm-6000 rpm, preferably 0.5-1000 rpm, and more preferably 0.5-500 rpm or 1-100 rpm; in the movement permeation, the container is first vacuumized to below 6 Pa, preferably below $6\times10^{-2}$ Pa, afterwards, an inert gas, specifically nitrogen or argon, is filled; in order to avoid problems such as deformation and cracking of the magnet due to nonuniform heating, a system of gentle heating and multi-section permeation and heat preservation is used, wherein the container is gently heated at a heating rate of 3-8° C./min to 800° C. and the temperature is kept at 800° C. for 1 h, then heated at a rate of 0.5-2° C./min to 900-1000° C. and the temperature is kept at 900-1000° C. for 8-12 h, afterwards rapidly cooled or naturally cooled to 40-60° C., wherein in the cooling, an inert-gas protective atmosphere is kept, and the magnet still maintains relative rotational movement with respect to the target permeation source; and E. after the movement permeating treatment is ended, taking out the magnet, and subjecting the magnet to tempering treatment at 550-600° C. for 4 h.

Tests of magnetic properties indicate: the oriented sintered magnet before the treatment in the present example has following typical magnetic properties and thermal stability: remanence Br of 13.58 kGs, coercivity Hcj of 18.03 kOe, magnetic energy product (BH)max of 42.93 MGOe, and magnetic flux heat loss of −11.2% when the magnet is heated from room temperature to 120° C. and then back to the room temperature.

The oriented sintered magnet after the treatment in the present example has following typical magnetic properties and thermal stability: remanence Br of 13.12 kGs, coercivity Hcj of 24.98 kOe, magnetic energy product (BH)max of 40.87 MGOe, and decreased magnetic flux heat loss of −2.1% when the magnet is heated from room temperature to 120° C. and then back to the room temperature.

Thus, the sintered magnet after the treatment in the present example, compared with that before the treatment, is stably improved in the coercivity by 37%, decreased in the remanence by less than 4%, and dramatically decreased in the magnetic flux heat loss from −11.2% before the treatment to −2.1% when the magnet is heated from room temperature to 120° C. and then back to the room temperature, thus the sintered magnet after the treatment is remarkably improved in both the magnetic properties and the thermal stability.

Further analysis indicates that the treated magnet includes following phase composition: ≥96% in volume of 2:14:1 main phase, about 0.1-4% in volume of a compound, a solid solution formed after any one or more selected from the group consisting of Ga, Nb, Cu, Al, Zr, Ti, O, C, F, and N entering the grain boundary phase or the grain boundary corner, wherein contents of elements O, C, F, and N in the grain boundary phase are higher than contents thereof in the main phase, contents of Ga, Cu, Al, Nb, Co, and Ti in the grain boundary phase are higher than contents thereof in the main phase, and a content of rare-earth in the main phase is higher than a content thereof in the grain boundary phase or the grain boundary corner, the main phase grain boundary is relatively clear and smooth, serving a relatively good function of demagnetization coupling, and grain boundaries between adjacent main grains are in uniform and continuous distribution, and have a certain width, thus an orientation degree is improved; by controlling ingredient ratios of various elements in the target permeation source prepared in step C, the rotational velocity in step D, and a highest permeation temperature and time, amounts of the above elements entering the main phase, amounts of the above elements entering the grain boundary phase, and amounts of the above elements entering the grain boundary corner phase can be adjusted and controlled.

The above-mentioned examples are merely preferred embodiments of the present invention, but should not be construed as limitation to the scope of protection of the present invention. It should be indicated that a person ordinarily skilled in the art further may make various alterations, substitutions, and improvements, without departing from the concept of the present invention, all of which fall within the scope of protection of the present invention.

What is claimed is:

1. A permeating treatment method of using a composition for a radially oriented sintered magnet, step a: preparing magnetic powder to be molded according to given components and ratios, followed by oriented molding, and then sintering to obtain the magnet, wherein an oriented magnetic field and the magnetic powder have relative rotation therebetween in the molding; the magnetic powder has following components and ratios (percentage by weight); rare-earth Pr and Nd in a total content of 28-31%, Dy+Tb+Ho in a total content of 2-5%, Co in a content of 0.2-0.8%, B in a content of 0.95-1.15%, Nb in a content of 0.2-1%, Cu in a content of <0.20%, Al in a content of 0.2-1.0%, a balance of Fe and impurities;

step b: pre-treatment: removing pollutants, and rust from a surface of the magnet, wherein an inner surface and an outer surface of the magnet are first subjected to a rough processing before the pre-treatment;

step c: preparing the composition as a target permeation source: performing high temperature baking above 1050° C. for the composition comprising any one or more raw materials selected from the group consisting of zirconium oxide, magnesium oxide, aluminum oxide or titanium oxide, then heating and melting metal gallium and adding the melted metal gallium to the baked raw material powder to form a pre-mixture, afterwards, adding terbium fluoride, carbonyl cobalt powder, and niobium powder (or zirconium powder) having baked at temperatures 120° C. sequentially to the pre-mixture to obtain the target permeation source after mixing them; and the target permeation source contains 0.1-5 wt % of metal Ga having a melting point of 29.8° C.;

step d: permeating treatment: the magnet having undergone the pre-treatment in step b and the target permeation source prepared in step c are disposed into a vacuum container that is configured to be heated and rotated according to a volume ratio of 1:1-1:100 to be subjected to the permeating treatment during moving; in a permeating process, the magnet and the target permeation source have relative movement therebetween all the time at a rotational velocity of 1-100 rpm, in the movement permeation, the container is first vacuumized to below 6 Pa, afterwards, a vacuum or inert-gas atmosphere is maintained throughout rotational permeation; further, the permeation is conducted at a temperature of 500-950° C. for less than 30 h, and wherein a system of heat preservation in sections is used in the permeation: heating the magnet at a first heating rate of 3-8° C./min to 700° C. and keeping the temperature at 700° C. for 1.5 h in a first section, then heating the magnet at a second heating rate of 1-3° C./min to 870° C. and keeping the temperature at 870° C. for 3-10 h in a second section, and then heated at a third rate of 0.5-2° C./min to 880-950° C. and the temperature is kept at 880-950° C. for 15-40 h, afterwards cooling the magnet to 40-80° C., wherein in the cooling, vacuum or an inert-gas protective atmosphere is kept, and the magnet still maintains relative rotational movement with respect to the target permeation source;

step e. after the movement permeating treatment is ended, separating the magnet from the target permeation source substance, and subjecting the magnet to tempering treatment at 450-550° C. for 3-8 h; and step f: obtaining a product after the tempering treatment.

2. The method according to claim 1, wherein in the cooling the magnet still maintains the macro relative movement with respect to the target permeation source, and wherein the heating rate in the second section is lower than the heating rate in the first section, and a total permeation time is controlled within 50 h.

3. The method according to claim 2, wherein the target permeation source comprises (a) 20-99.99 wt % of a permeation additive and (b) 0.01-80 wt % of the monomer or the compound composed of elements that are permeable into 2:14:1 type main phase, grain boundary phase, and/or grain boundary corner phase of the magnet, and the total weight percentage of (a) and (b) is 100%; the elements that are permeable into the 2:14:1 type main phase of the magnet comprise any one or more selected from the group consisting of La, Ce, Pr, Nd, Pm, Sm, Eu, Gd, Tb, Dy, Ho, Er, Tm, Yb, Lu, Y, and Sc, and any one or more selected from the group consisting of Fe, Co, Ni, and B; the elements that are permeable into the grain boundary phase and/or the grain boundary corner phase comprise any one or more selected from the group consisting of Ga, Nb, Cu, Al, Zr, Ti, O, F, and N; the compound comprises oxides, fluorides, carbides, nitrides, hydrides, alloys and solid solutions of the above elements; the permeation additive is an auxiliary agent of the target permeation source and/or a carrier of a permeable substance, comprising any one or more selected from the group consisting of aluminum oxide, magnesium oxide, zirconium oxide and titanium oxide.

4. The method according to claim 2, wherein the target permeation source comprises (a) 30-99.99 wt % of a permeation additive and (b) 0.1-70 wt % of a monomer or a compound composed of elements that are permeable into 2:14:1 type main phase, grain boundary phase, and/or grain boundary corner phase of the magnet and the total weight percentage of (a) and (b) is 100%.

5. The method according to claim 4, wherein the target permeation source comprises: 35-96.4 wt % of any one or more selected from the group consisting of zirconium oxide, magnesium oxide, aluminum oxide and titanium oxide, 0.1-5 wt % of metal gallium, 2-30% of terbium fluoride, 1-5% of dysprosium fluoride, and 0.5-25 wt % of zirconium powder and/or niobium powder; alternatively, the target permeation source may contain: 55-94.4 wt % of any one or more selected from the group consisting of zirconium oxide, magnesium oxide, aluminum oxide and titanium oxide, 0.1-5 wt % of metal gallium, 5-35% of terbium fluoride, and 0.5-5 wt % of carbonyl cobalt powder; alternatively, the target permeation source contain 55-99.9 wt % of any one or more selected from the group consisting of zirconium oxide, magnesium oxide, aluminum oxide or titanium oxide, 0.1-5 wt % of metal gallium, 0-35% of terbium fluoride, 0-2 wt % carbonyl cobalt powder, and 0-3 wt % of niobium powder or zirconium powder; alternatively, the target permeation source contain 30-98.5 wt % of any one or more selected from the group consisting of zirconium oxide, magnesium oxide, aluminum oxide or titanium oxide, 0.1-5 wt % of metal gallium, 0.2-25% of terbium fluoride, 0.5-20% of dysprosium fluoride, 0.2-10 wt % of carbonyl cobalt powder, and 0.5-10 wt % of niobium powder or zirconium powder or titanium powder.

6. The method according to claim 1, wherein the magnet may be also replaced by a parallelly oriented sintered ring magnet; an arc magnet, or a sheet magnet.

7. The method according to claim 1, wherein the magnet has 2:14:1 type main phase, and composition thereof is represented by a following general formula:

$$R_aT_bM_cB_dX_e:$$

where R is at least one element selected from rare-earth elements including Y and Sc, T is either or both of Fe and Co;

M is at least one element selected from the group consisting of Al, Ti, Ni, Cu, Ga, Zr, and Nb;

B is boron;

and X is at least one element selected from the group consisting of O, F, N, and C;

a, b, c, d, and e represent weight percentages, $28 \leq a \leq 36$, $0.05 \leq c \leq 8.0$, $0.9 \leq d \leq 1.3$, $e \leq 0.5$, a balance of b.

8. A method for improving coercivity of an oriented sintered magnet, comprising following steps:

step a: preparing magnetic powder to be molded according to given components and ratios, followed by oriented molding, and then sintering to obtain an oriented sintered magnet, wherein an oriented magnetic field and the magnetic powder have relative rotation therebetween in the molding; the magnetic powder has following components and ratios (percentage by weight): rare-earth Pr and Nd in a total content of 28-31%, Dy+Tb+Ho in a total content of 2-5%, Co in a content of 0.2-0.8%, B in a content of 0.95-1.15%, Nb in a content of 0.2-1%, Cu in a content of <0.20%, Al in a content of 0.2-1.0%, a balance of Fe and impurities;

step b: pre-treatment: removing pollutants, and rust from a surface of the magnet, wherein an inner surface and an outer surface of the magnet are first subjected to a rough processing before the pre-treatment;

step c: preparing a composition as a target permeation source: performing high temperature baking above 1050° C. for the composition comprising any one or more selected from the group consisting of zirconium oxide, magnesium oxide, aluminum oxide or titanium oxide, then heating and melting metal gallium and adding the melted metal gallium to the baked raw material powder to form a pre-mixture, afterwards, adding terbium fluoride, carbonyl cobalt powder, and niobium powder (or zirconium powder) having baked at temperatures 120° C. sequentially to the pre-mixture to obtain the target permeation source after mixing them; and the target permeation source contains 0.1-5 wt % of metal Ga having a melting point of 29.8° C.;

step d: permeating treatment: the magnet having undergone the pre-treatment in step b and the target permeation source prepared in step c are disposed into a vacuum container that is configured to be heated and rotated according to a volume ratio of 1:1-1:100 to be subjected to the permeating treatment during moving; in a permeating process, the magnet and the target permeation source have relative movement therebetween all the time at a rotational velocity of 1-100 rpm, in the movement permeation, the container is first vacuumized to below 6 Pa, afterwards, a vacuum or inert-gas atmosphere is maintained throughout rotational permeation; further, the permeation is conducted at a temperature of 500-950° C. for less than 30 h, and wherein a system of heat preservation in sections is used in the permeation: heating the magnet at a first heating rate of 3-8° C./min to 700° C. and keeping the temperature at 700° C. for 1.5 h in a first section, then heating the magnet at a second heating rate of 1-3° C./min to 870° C. and keeping the temperature at 870° C. for 3-10 h in a second section, afterwards cooling the magnet to 40-100° C.; and then heated at a third rate of 0.5-2° C./min to 880-950° C. and the temperature is kept at 880-950° C. for 15-40 h, afterwards cooling the magnet to 40-80° C., wherein in the cooling, vacuum or an inert-gas protective atmosphere is kept, and the magnet still maintains relative rotational movement with respect to the target permeation source;

step ed: separating the magnet from a target permeation source substance after the permeating treatment is finished, and subjecting the magnet to a tempering treatment; the tempering treatment is conducted at 400-600° C. for 1-20 h; and step f: obtaining a product after the tempering treatment.

9. The method according to claim 8, wherein the magnet is a ring magnet, and a magnetization direction thereof is radially oriented along a radius direction of the ring magnet.

10. The method according to claim 8, wherein in step B, the target permeation source comprises (a) 20-99.99 wt % of a permeation additive and (b) 0.01-80 wt % of the monomer and/or the compound composed of elements that are permeable into the 2:14:1 type main phase, grain boundary phase, and/or grain boundary corner phase of magnet and the total weight percentage of (a) and (b) is 100%; the permeation additive is an auxiliary agent of the target permeation source and/or a carrier of a permeable substance, comprising any one or more selected from the group consisting of aluminum oxide, magnesium oxide, zirconium oxide, and titanium oxide; the elements that are permeable into 2:14:1 type main phase of the magnet comprise any one or more selected from the group consisting of La, Ce, Pr, Nd, Pm, Sm, Eu, Gd, Tb, Dy, Ho, Er, Tm, Yb, Lu, Y, and Sc and any one or more selected from the group consisting of Fe, Co, Ni, and B, the elements that are permeable into the grain boundary phase and/or the grain boundary corner phase comprise any one or more selected from the group consisting of Ga, Nb, Cu, Al, Zr, Ti, O, F, and N; the compound comprises oxides, fluorides, carbides, nitrides, hydrides, alloys and solid solutions of the above elements.

11. The method according to claim 8, wherein in the cooling the magnet still maintains the relative movement with respect to the target permeation source, and wherein the heating rate in the second section is lower than the heating rate in the first section, and a total permeation time is controlled within 30 h.

12. The method according to claim 9, wherein the magnet comprises a mold and an oriented magnetic field and the mold have rotational movement therebetween; and the mold comprises a molding that comprises following steps: (1) filling a mold cavity with magnetic powder to be molded, providing an inner magnetic pole inside the mold cavity, and providing an outer magnetic pole outside the mold cavity; (2) rotating the outer magnetic pole relative to the mold cavity, or rotating the mold cavity relative to the outer magnetic pole, wherein the oriented magnetic field is generated between the inner magnetic pole and the outer magnetic pole, and the oriented magnetic field and the magnetic powder have relative rotation therebetween for magnetization and radial orientation of the magnetic powder; (3) while rotating, applying a gradually increased pressure to compress and mold the magnetic powder, to obtain a blank of the radially oriented magnet, which the blank is subjected to vacuum sintering at 1000-1100° C. to obtain the magnet before treatment; alternatively, the molding comprises following steps: (1) filling a mold cavity with magnetic powder to be molded, providing a magnetic core inside the mold cavity, and providing a plurality of outer magnetic poles symmetrically outside the mold cavity; (2) rotating the plurality of outer magnetic poles simultaneously with respect to the mold cavity, or rotating the mold cavity with respect to the outer magnetic poles, wherein a plurality of oriented magnetic fields are generated between the magnetic core and the plurality of outer magnetic poles, and the oriented magnetic fields and the magnetic powder have relative rotation therebetween for magnetization and radial orientation of the magnetic powder; (3) while rotating, applying a gradually increased pressure to compress and mold the magnetic powder, to obtain a blank of the radially oriented magnet, which the blank is subjected to vacuum sintering at 1000-1100° C. to obtain the magnet before treatment; the magnetic fields are constant magnetic fields, magnetic fields with regular variations, or magnetic fields with irregular variations.

13. The method according to claim 8, wherein the target permeation source comprises 20-99.99 wt % of a permeation additive and 0.01-80 wt % of a monomer or a compound composed of elements that are permeable into 2:14:1 type main phase, grain boundary phase, and/or grain boundary corner phase of the magnet, and wherein the permeation additive is any one or more selected from the group consisting of aluminum oxide, magnesium oxide, zirconium oxide and titanium oxide.

* * * * *